United States Patent [19]

Seetharaman et al.

[11] Patent Number: 5,467,797

[45] Date of Patent: Nov. 21, 1995

[54] TWO-POSITION THREE-WAY SOLENOID VALVE

[75] Inventors: Viswanath Seetharaman, Anderson, Ind.; David F. Reuter, Beavercreek, Ohio

[73] Assignee: General Motors Corporation, Detroit, Mich.

[21] Appl. No.: 362,227

[22] Filed: Dec. 23, 1994

[51] Int. Cl.⁶ .............................. F16K 15/14; F16K 31/06
[52] U.S. Cl. ...................... 137/599; 137/854; 251/129.14
[58] Field of Search ................................... 137/599, 854, 137/625.48, 599.1; 251/129.14

[56] References Cited

U.S. PATENT DOCUMENTS

| | | | |
|---|---|---|---|
| 2,169,043 | 8/1939 | Goehring | 137/599.1 |
| 3,227,175 | 1/1966 | Remington et al. | 137/599.1 |
| 4,620,565 | 11/1986 | Brown | 251/129.14 X |
| 4,938,545 | 7/1990 | Shuey et al. | 303/119 |
| 5,054,517 | 10/1991 | Liesenhoff et al. | 137/854 X |
| 5,135,027 | 8/1992 | Miki et al. | 251/129.14 X |
| 5,163,706 | 11/1992 | Maguran et al. | 137/854 X |

FOREIGN PATENT DOCUMENTS 1365189  8/1974  United Kingdom .............. 251/129.14

*Primary Examiner*—Stephen M. Hepperle
*Attorney, Agent, or Firm*—Jeffrey A. Sedlar

[57] ABSTRACT

A solenoid valve is provided which achieves the function of a two-position, three-way directional control valve and functions at high pressures with low leakage rates. In addition, the valve provides a cost effective and simplified configuration to additionally achieve the functions of a free-flowing forward check valve and a high pressure relief valve integrated with the directional control valve. The invention is directed towards providing a valve with low cost and a minimum penalty with regards to electrical power consumption.

14 Claims, 2 Drawing Sheets

TWO-POSITION THREE-WAY SOLENOID VALVE

BACKGROUND OF THE INVENTION

The present invention relates to solenoid actuated valves for the directional control of fluid flow.

The subject of this application is related to the following co-pending patent application: Ser. No. 362,229 entitled "Integrated ABS/TCS Hydraulic Modulator Braking System" commonly assigned and filed concurrently with this specification.

Directional flow control valves of numerous variety are available that provide many types of control characteristics which are often tailored to specific applications. Although sharing the common function of directional flow control these valves vary considerably in construction and operation.

A common simple type of directional flow control valve is a two-position, three-way valve. A facility for providing two finite positions of a moving element yields fluid flow control by opening and closing flow paths through the valve by placement of the moving element in definite positions.

A conventional method of valve actuation to position the moving element is through use of a solenoid. With a solenoid actuator, electric energy is applied to a coil which creates a magnetic field that draws an armature into the coil. The armature motion is typically transmitted through a rod which in turn positions the moving member.

Conventional three-way fluid flow control valves as thus far described are generally simple in construction and provide limited directional control through the valve between a first port and either of a second or a third port. When more complicated control mechanisms are required to be provided by the valve in order to adequately control a complicated fluid control scheme of a system, such a conventional valve must be supplemented with additional componentry. When functions other than solely providing directional control are required, additional fluid flow control mechanisms such as check valves and additional directional control valves are added to the system. When available space does not permit the addition of ancillary flow control mechanisms or the functional response of amassed individual components is unacceptable, the conventionally available fluid flow control components are inadequate. Therefore, with complicated fluid control schemes a new flow control mechanism is required.

SUMMARY OF THE INVENTION

The present invention is, generally, a two-position, three-way flow control valve. In addition to controlling the direction of fluid flow between first, second and third ports, the valve is multi-functional. An integral check valve is provided which allows unrestricted flow from the first port to the second port in the valve's de-energized state or normal position. The valve isolates the first port from a third port in the normal position. The flow of fluid from the second port to the first port is prohibited by a check valve in the valve's energized state or second position. Additionally, in the valve's energized state a pressure relief function is provided from the second port to the first and third ports when a preselected relief pressure exists.

The valve operates in a fluid system such that when energized and shifted to the second position, it allows the part of the fluid system connected to the second port to build up a maximum pressure. This function is preferably provided by energizing the solenoid which causes the valve to shift from the normal position to the second position. This functions to isolate the second port from the first and third ports and additionally, provides an integral relief valve that permits the building pressure in the part of the fluid system connected to the second port to be released at a predetermined pressure.

In addition, the valve includes a check arrangement that functions to permit fluid to freely flow between the first port and the second port when the valve is in the de-energized state.

DETAILED DESCRIPTION OF THE PRESENTLY PREFERRED EMBODIMENT

Figure 1:
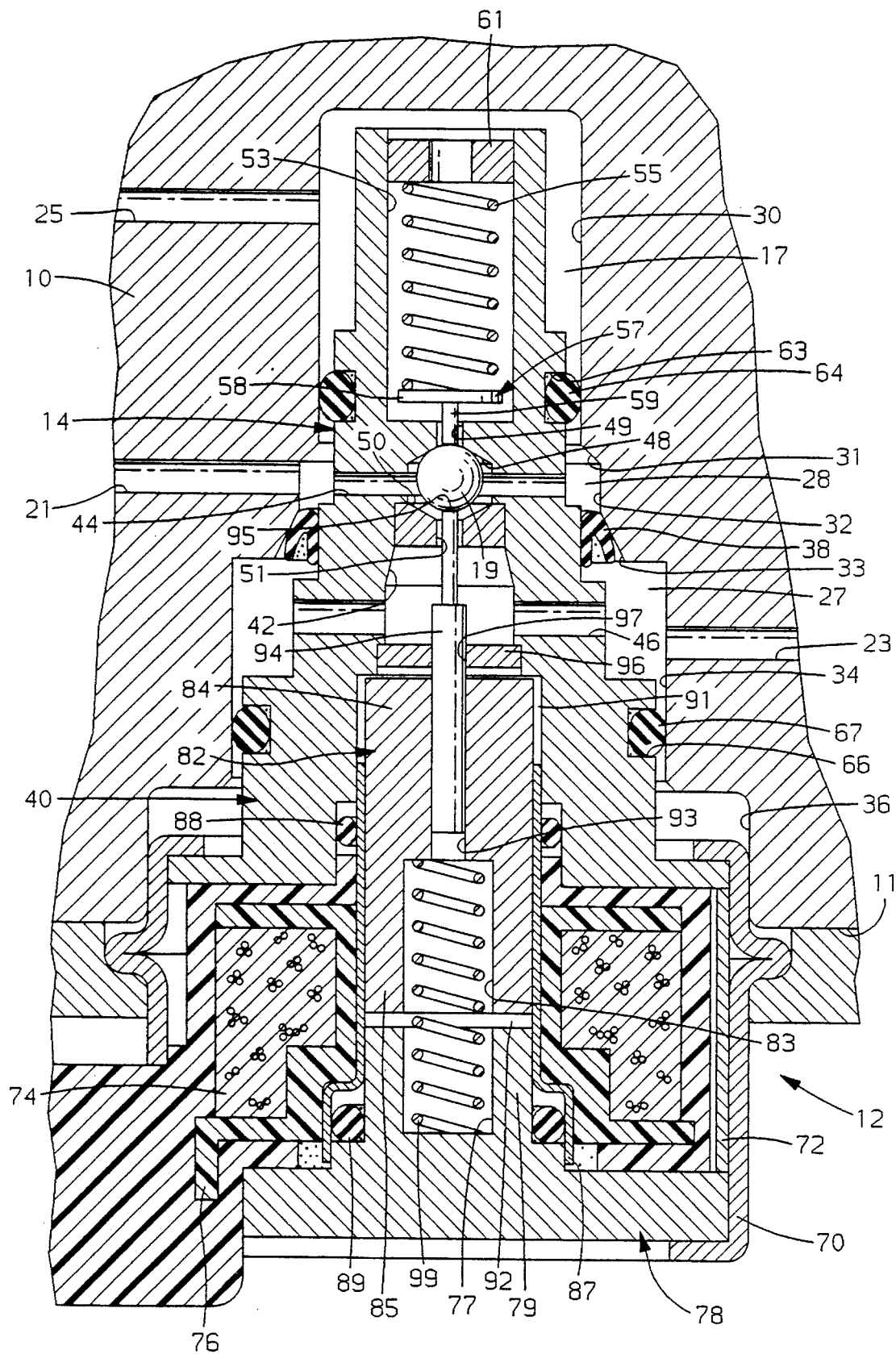
FIG. 1 is a fragmentary, cross-sectional view of a solenoid operated valve incorporating aspects of the present invention, shown in the de-energized state.

Referring to the drawings, illustrated in FIG. 1 is a valve depicting the operational features of the present invention. Other valve arrangements including the specific features provided by the present invention are possible while preferably maintaining a simplified configuration according to the present invention.

Solenoid valve 12 comprises, generally, a module 10 which provides a first port 21, a second port 23 and a third port 25. Ports 21, 23, and 25 comprise bores which extend through module 10 to cavity 17.

Cavity 17 provides a specifically formed opening for the insertion of valve assembly 14. Cavity 17 includes generally cylindrical openings arranged in a succeedingly larger diameter towards the outer surface 11 of module 10 identified as cylindrical segments 30, 32, 34, and 36. Interposed between cylindrical segments 30 and 32 is frusto-conical segment 31. Interposed between the cylindrical segments 32 and 34 is frusto-conical segment 33.

Valve assembly 14 includes an integrated valve and solenoid actuator assembly. Housing 40 provides generally a base for the valving and actuating components. An axial opening 42 extends through housing 40. Extending transversely through housing 40 are bores 44 and 46 which provide fluid passageways. Housing 40 also includes a valve seat 48 which is coaxially disposed with axial opening 42.

Also coaxially disposed with axial opening 42 of housing 40 is insert valve seat 50 which is positioned in an opposed relationship with, and across bore 44 from, valve seat 48. Insert valve seat 50 includes axial opening 51 and valve seat 48 includes axial opening 49.

Positioned between valve seat 48 and insert valve seat 50 is ball 19. Ball 19 functions as an obturator, operating to alternately close the axial opening 51 in insert valve seat 50 and the axial opening 49 of valve seat 48.

Housing 40 includes chamber 53 in which spring 55 is positioned. Also contained within chamber 53 is plunger 57 which includes spring seat 58 and rod 59. Rod 59 extends from spring seat 58 through axial opening 49 and contacts ball 19. The spring 55 is compressed between spring seat 58 of plunger 57 and spring retainer 61 such that it operates to force rod 59 against ball 19.

O-ring 64 is positioned in groove 63 between housing 40 and cavity 17 at cylindrical segment 30. Positioned in groove 66 between housing 40 and cavity 17 at cylindrical segment 34 is O-ring seal 67. Positioned between housing 40 and the wall of cavity 17 at frusto-conical segment 33 is lip seal 38.

The solenoid actuator of the valve assembly 14 includes a case 70 which is substantially cylindrical in shape and functions to contain the solenoid actuator. A sleeve 72 comprised of ferromagnetic material is positioned inside the case 70. Sleeve 72 is substantially cylindrical.

An annular coil 74 formed of a plurality of turns of wire wound on a bobbin 76 is positioned within sleeve 72. A stop 78 is also positioned within case 70 and near its outer perimeter contacts sleeve 72.

Stop 78 includes cylindrical portion 79 which has an axial opening 77 and extends into the bobbin 76 of coil 74. Stop 78 is comprised of ferromagnetic material. An armature 82 comprised of a ferromagnetic material and cylindrical in shape exhibits axial opening 83. Armature 82 includes a first end 84 which is positioned within the axial opening 42 of housing 40 and a second end 85 which is positioned within the bobbin 76 of coil 74 near stop 78.

A sleeve 87 of non-magnetic material is cylindrical in shape and extends from within the axial opening 42 of housing 40 outwardly therefrom and through the coil 74. Sleeve 87 provides a bearing surface for armature 82 and operates to maintain the radial positioning of armature 82.

The sleeve 87 prevents the armature 82 from making contact with housing 40 to maintain a relatively small secondary air gap 91 between the housing 40 and armature 82 and operates to thereby increase the magnetic efficiency of the solenoid. The magnetic circuit's working air gap 92 is positioned between armature 82 and stop 78.

Positioned between the housing 40 and sleeve 87 is an O-ring 88. Near the opposite end of sleeve 87 and positioned between sleeve 87 and stop 78 is O-ring 89. The O-rings 88 and 89 act to prevent the transmission of high pressure fluid from the valve through the solenoid assembly.

A rod 94 is fixed in the axial opening 93 of armature 82. Rod 94 extends from armature 82, through the axial opening 51 of insert valve seat 50 and contacts ball 19. A rod guide 96 is positioned within the axial opening 42 of housing 40 and includes axial opening 97 through which rod 94 extends.

A spring 99 is positioned within the axial openings 77 and 83 and is compressed between the armature 82 and stop 78. Therefore, spring 99 operates to force armature 82 away from stop 78 and acts to maintain contact between the end 95 of rod 94 and ball 19.

The actuator's magnetic circuit includes armature 82, stop 78, sleeve 72 and housing 40. Magnetic flux is generated in the circuit by coil 74. The working air gap 92 lies between armature 82 and stop 78 and the secondary air gap 91 is located between the armature 82 and the housing 40. Of importance to the actuator's performance are the magnetic circuit's lines of flux (not shown). The flux traverses the air gaps 91–92 and induces an electromagnetic force that acts upon the armature 82 and varies as the armature 82 moves depending on the size of the working air gap 92 between the armature 82 and the stop 78.

Figure 2:
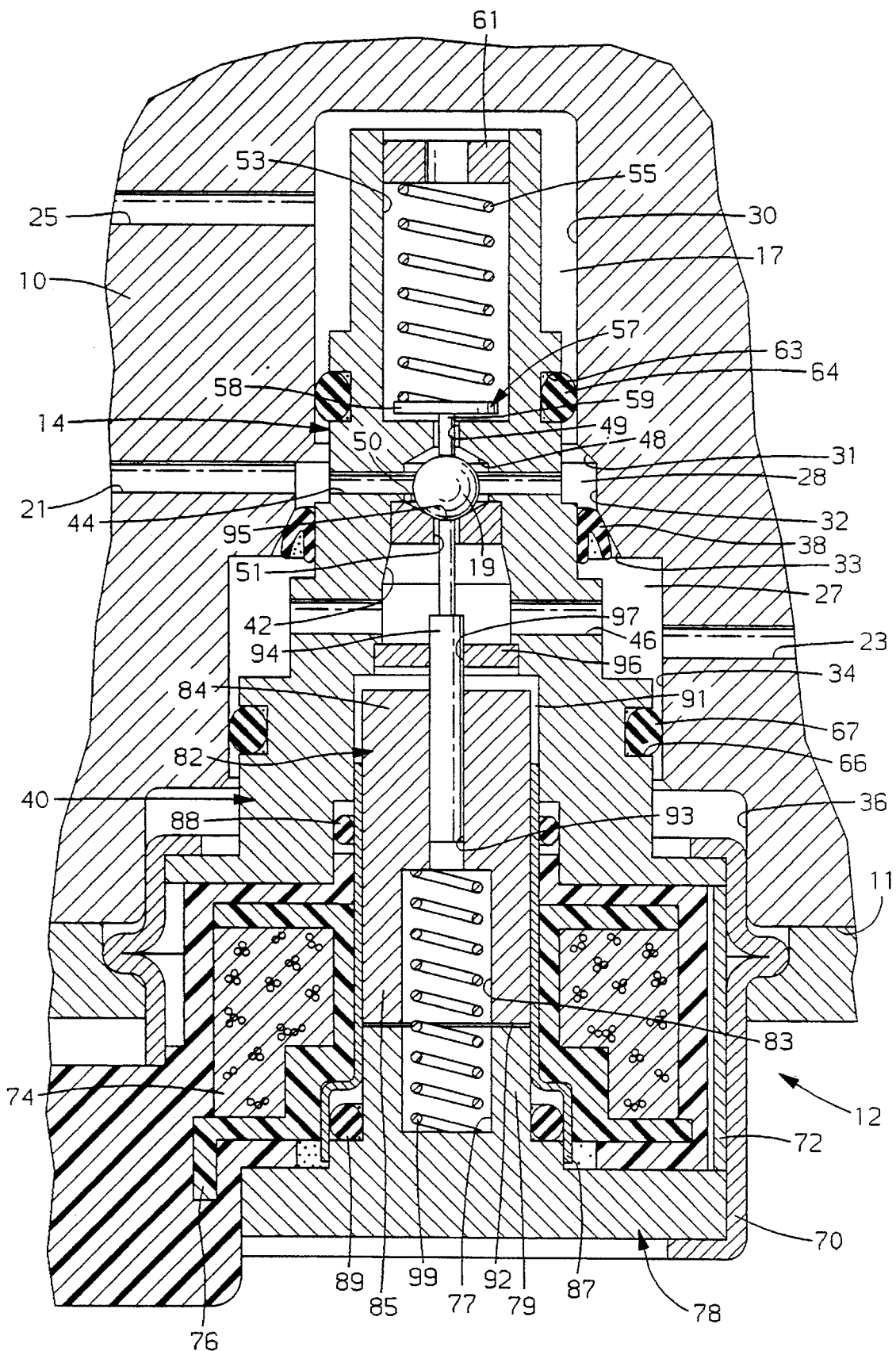
FIG. 2 is a fragmentary, cross-sectional view of a solenoid operated valve incorporating aspects of the present invention, shown in the energized state.

The ball return spring 55 serves the function of the static load for the pressure relief function of the valve assembly 14. The ball return spring 55 is sized to hold the ball 19 against the insert valve seat 50 as shown in FIG. 2 to maintain pressure in the portion of a fluid system (not illustrated), connected to the second port 23, at a predetermined maximum pressure. In the preferred embodiment the maximum pressure is approximately 1000 psi.

The invention utilizes a ball 19 which is independent of rod 94 and in cooperation with insert valve seat 50 facilitates assembly of the components. The armature return spring 99 is sized to be stronger than the ball return spring 55. Therefore, armature return spring 99 ensures that the ball 19 is held against valve seat 48 when the solenoid is in the de-energized state as shown in FIG. 1 and thus functions for isolation of the first port 21 from the third port 25.

The ball return spring 55 and the armature return spring 99 work against each other and the force which must be produced by the actuator to move the armature 82 is substantially, the difference between the spring forces. When the ball 19 is seated on the insert valve seat 50 the actuator must overcome the entire force of the armature return spring 99 to maintain the position of armature 82. This is because all of the force used by the ball return spring 55 is offset by the reaction from the insert valve seat 50.

Therefore, as indicated above, the magnetic circuit is configured such that this is the position at which the armature 82 is closest to the stop 78 in the magnetic circuit. The magnetic force of the armature 78 at this small working gap 92 distance is relatively large for a given amount of electrical energy input into the coil 74. Thus, the electromagnetic force on armature 82 is able to overcome the force of the spring 99 and functions to ensure the operation of the ball return spring 55 for the pressure relieve mode of operation of the valve assembly 14.

In the de-energized state of FIG. 1, the armature return spring 99, as described above, is sized to be stronger than the ball return spring 55. This functions to ensure that the ball 19 is seated against the valve seat 48 when the solenoid is de-energized. Seating of the ball 19 isolates the third port 25 from the first port 21. Concurrently, fluid from the first port 21 can freely flow to the second port 23 through the valve assembly 14.

A one-directional free-flowing check valve arrangement comprised of lip seal 38 is provided which allows a rapid build up of pressure in the portion of the fluid system connected to the second port by means of fluid flowing from the first port 21 to the second port 23 through the valve. This ensures that restriction to fluid flow through the valve between the first port 21 and the second port 23 is minimized.

To provide for alternate operation of the fluid system the solenoid is energized and the valve assembly 14 takes the position illustrated in FIG. 2. This opens the passageway through axial opening 49 between the first port 21 and the third port 25. Concurrently, the part of the fluid system connected to the second port 23 is isolated to provide the facility to build the pressure therein through means (not illustrated), in the part of the fluid system connected thereto.

Pressure in the part of the fluid system connected to the second port 23 is permitted to build to a predetermined maximum pressure wherein the ball return spring 55 holds ball 19 against the insert valve seat 50 until that predetermined pressure is reached. When the pressure exceeds the predetermined maximum limit, the ball 19 is released from the insert valve seat 50 by the compression of ball return spring 55. The lip seal 38 operates to maintain the pressure in the part of the fluid system connected to the second port 23 by preventing flow from chamber 27 to chamber 28 between lip seal 38 and the wall of frusto-conical segment 33.

When the pressure in chamber 27 causes the ball 19 to become unseated from insert valve seat 50, fluid is permitted to flow from the part of the fluid system connected to the second port 23 through the valve assembly 14 to the first port 21 and third port 25 and therethrough, thereby providing a pressure relief function.

As described above, through the design of the armature return spring 99 and the ball return spring 55 and through providing the lip seal 38, the valve assembly 14 is able to provide a two-position, three-way function and a check valve function with a pressure relief function in combination in one valve assembly. The use of a reduced number of individual components in an assembly designed for manufacturability renders a device according to the present invention which is a cost effective solution to the problem of providing the required operational features in a limited package size.

What is claimed is:

1. A directional control valve comprising:

a housing;

a solenoid actuator engaging the housing;

a valve member contained within the housing and actuated by the solenoid actuator providing directional flow control;

an integral check including a lip seal engaging the housing and permitting a flow in one direction between the lip seal and the housing bypassing the valve member; and an integral pressure relief including the valve member captured between a first valve seat and a second valve seat with a first spring forcing the valve member toward the first valve seat and a second spring forcing the valve member toward the second valve seat.

2. A valve comprising:

a housing;

a first valve seat formed by the housing with a first opening therethrough;

a second valve seat contained in the housing with a second opening therethrough;

an obturator alternatively positionable against the first and second valve seats to alternatively close the first and second openings;

a first spring forcing the obturator toward the first valve seat;

a second spring forcing the obturator toward the second valve seat; and a check including a lip seal providing a one-way flow route in parallel to the second opening.

3. A valve according to claim 2 wherein the second spring, obturator and second valve seat provide a one-way pressure relief through the second opening.

4. A valve comprising:

a housing having a cavity with a first valve seat formed in the cavity and having a first opening therethrough forming a first flow passage segment through the first opening;

an insert with a second valve seat having a second opening therethrough forming a second flow passage segment and positioned in the cavity such that the first valve seat and the second valve seat are disposed in an opposed, facing relationship;

an obturator captured between the first valve seat and the second valve seat alternatively positionable to close the first opening and the second opening; and a lip seal positioned in the cavity providing a one-way flow passage segment in parallel with the second flow passage segment.

5. A valve according to claim 4 further comprising a ball return spring applying a first force forcing the obturator toward the second valve seat such that when the obturator is positioned to close the second opening a fluid pressure at the second opening sufficient to compress the ball return spring operates to open the second opening and the second flow passage segment formed therethrough.

6. A valve according to claim 5 further comprising an armature having a rod contacting the obturator and an armature return spring applying a second force forcing the armature and rod toward the obturator and forcing the obturator toward the first valve seat wherein the second force of the armature return spring normally overcomes the first force of the ball return spring to position the obturator against the first valve seat to close the first opening.

7. A valve according to claim 6 further comprising a coil positioned partially about the armature and operable to apply a third force thereto such that when the coil is energized the armature is moved to compress the armature return spring wherein the first force of the ball return spring forces the obturator against the second valve seat to close the second opening.

8. A valve according to claim 7 wherein the third force is maximized when the obturator is positioned against the second valve seat.

9. A valve having first, second and third ports comprising:

a first valve seat with a first opening therethrough;

a second valve seat with a second opening therethrough;

an obturator having a normal position against the first valve seat establishing fluid communication between the first and second ports through the second opening;

a solenoid, when energized effecting a second position of the obturator against the second valve seat establishing fluid communication between the first port and the third port through the first opening; and a lip seal check positioned between the first port and the second port providing a bypass flow path around the second opening permitting fluid communication from the first port to the second port through the bypass flow path and preventing fluid communication from the second port to the first port through the bypass flow path.

10. A valve according to claim 9 further comprising a spring wherein the spring forces the obturator toward the second seat wherein when the solenoid is energized the obturator is forced against the second seat by the spring.

11. A valve according to claim 10 wherein a fluid force in the third port sufficient to move the obturator to compress the spring operates to establish fluid communication from the second port to the first and third ports.

12. A valve having first, second and third ports and first and second operative positions comprising:

an obturator;

a first valve seat engageable by the obturator;

a first spring applying a first force on the obturator directed toward the first valve seat;

a second valve seat engageable by the obturator;

a second spring applying a second force on the obturator directed toward the second valve seat wherein the first force normally overcomes the second force to position the obturator against the first valve seat to the first operative position wherein fluid communication is established between the first and second ports;

an actuator selectively operable to counteract the force of the first spring wherein the second spring positions the obturator against the second valve seat to the second operative position when the actuator is operated wherein fluid communication is thereby established between the first and third ports; and a lip seal check positioned between the first and second ports through which fluid communication is established from the first port to the second port and through which fluid communication is prohibited from the second port to the first port in both of the first and second operative positions;

wherein, in the second operative position fluid communication is established through the second valve seat between the second and the first and third ports when a fluid pressure at the second port is sufficient to move the obturator to compress the second spring and move off the second valve seat.

13. A valve according to claim 12 wherein the actuator includes an armature guidably movable within a non-magnetic sleeve and responsive to an energizeable coil.

14. A valve according to claim 13 wherein the actuator produces a force maximized when the obturator is in the second operative position.

* * * * *